Dec. 6, 1960
A. BORK
2,962,957
BREAD HOLDER FOR ELECTRIC TOASTERS
Filed Sept. 11, 1958
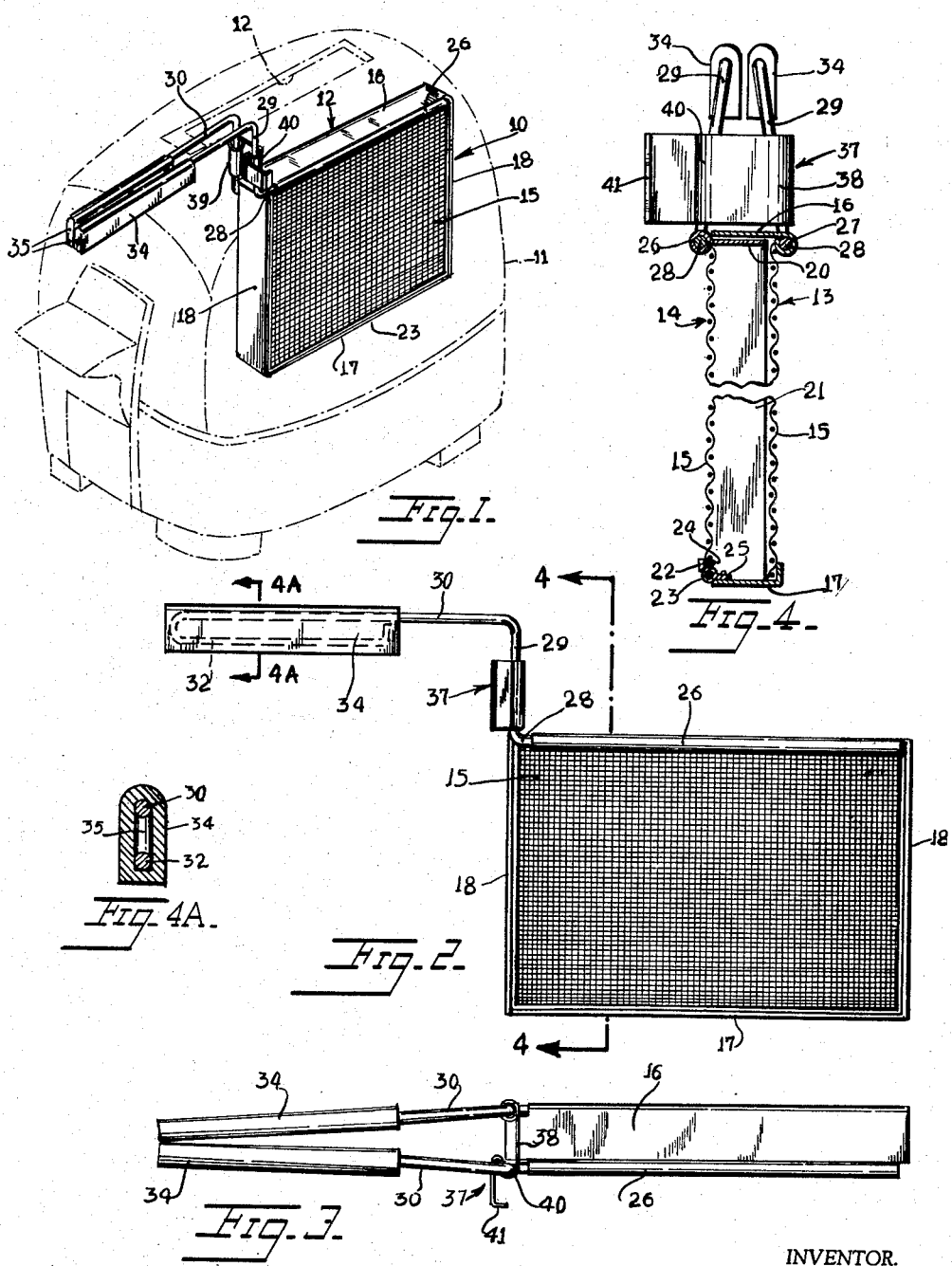
INVENTOR.
ADAM BORK
BY
ATTORNEY

2,962,957
BREAD HOLDER FOR ELECTRIC TOASTERS

Adam Bork, 164 Beach 65th St., Arverne, N.Y.

Filed Sept. 11, 1958, Ser. No. 760,315

1 Claim. (Cl. 99—402)

This invention relates to a device for holding a slice of bread for toasting in the toasting slot of an electric toaster so that the slice may be inserted in or removed from the toaster without awaiting the automatically timed or manually effected operation of the usual ejecting mechanism and is an improvement over the toast holder disclosed in my Patent No. 2,849,947.

An important object of the present invention is to provide a toast holder that is compact and will fit readily into the toasting slot of any conventional toaster.

Another object of the invention is to provide means for facilitating insertion of the slice of bread into the toast holder and also removal of the toasted slice.

A further object of the invention is to provide simple and improved latching means on the handle portion of the toast holder for holding the frames of the toast holder in closed position.

It is also proposed, according to a modification of the invention, to provide spring pressed means for automatically closing the frames of the toast holder and for manually opening the frames.

It is also an object of the invention to provide a toast holder that is simple in construction and that can be manufactured and sold at a reasonable cost.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:

Fig. 1 is a perspective view of a toast holder made in accordance with one form of the invention, in operative position in an electric toaster, the toaster being shown in dot-dash lines.

Fig. 2 is a slightly enlarged side elevational view of the toast holder.

Fig. 3 is a top plan view thereof.

Fig. 4 is a vertical sectional view taken on the plane of the line 4—4 of Fig. 2, on a still further enlarged scale.

Fig. 4A is a vertical sectional view taken on the plane of the line 4A—4A of Fig. 2.

In Figs. 1–4, a toast holder made in accordance with the invention and designated generally by the reference numeral 10 is shown. The toast holder 10 is adapted to be used with a conventional automatic electric toaster 11 having the usual pair of toast slots 12, in either of which slots the body portion of the holder 10 may be bodily inserted while holding a slice of bread, a roll, a muffin or the like.

The bread or toast holder 10 comprises a pair of rectangular-shaped frames 13 and 14. Each frame is formed of a sheet of heat resistant material such as wire mesh 15. Flanges 16 and 17 are secured by soldering, welding or in any suitable manner, along one long edge thereof to the top and bottom edges, respectively, of the wire mesh sheet 15 of frame 13 as viewed in Figs. 1 and 2, whereby the flanges extend laterally of the sheet in parallel relationship. Similar flanges 18 are similarly secured and arranged along the ends of the sheet 15 so that there is a continuous flange around the edges of the sheet 15 of frame 13.

Along the elongated top edge of the wire mesh sheet 15 of frame 14 as viewed in Figs. 1 and 2, a flange 20 similar to flanges 16 and 17 is secured to the edge of the wire mesh sheet 15 so as to extend laterally of the sheet. Similar flanges 21 are similarly secured and arranged along the ends of the sheet 15 of frame 14 so that there is a continuous flange along the top long edge and the end edges of the sheet 15. Along the opposed or bottom long edge of the sheet 15 of frame 14, a narrow strip of sheet metal 22 is provided, reinforcing said long edge of the sheet.

The reinforcing strip 22 is hingedly connected to the bottom long flange 17 of frame 13 by means of a hinge construction 23, extending the length of the strip and flange, having one hinge leaf 24 secured to the strip 22 and the other hinge leaf 25 secured to the bottom flange 17 of frame 13. The dimensions of the frame 14 are slightly less than the dimensions of the frame 13 so that frame 14 is adapted to fit within and become nested inside frame 13.

The handle construction of the toast holder will now be described. The secured edge of flange 20 of frame 13 is rolled upon itself forming an elongated tube 26, the length of the flange. A similar elongated tube 27 is formed on the secured edge of flange 16 of the frame 14. An elongated round wire 28 is inserted into each tube 26 and 27 and is secured therein by friction. The wire may be secured therein by adhesive if desired. The wire 28 is bent at right angles, upwardly as viewed in Figs. 1 and 2 as indicated at 29, and continues outwardly of the frames to form a handle portion 30 in alignment with and in prolongation of the wire 28, but spaced above the same as viewed in Fig. 2. The handle portion 30 is bent upon itself to form an elongated loop 32 extending to a point inwardly remote from the upright bent portion 29, forming a bearing for supporting a flattened tubular handle member or cover 34 of plastic, cardboard or any other suitable material, closed at one end as indicated at 35 and open at its other end. The handle portions 30 with their covers 34 converage toward each other and touch each other at their outer ends. The covers enclose the loops 32.

In accordance with the present invention, a latching device 37 is mounted on the upright portion 29 of the handle wire 28 of frame 13. The latching device comprises a narrow rectangular strip or ribbon 38 of sheet metal rolled at one end loosely around the upright portion 29 as indicated at 39 for pivoting thereon. Intermediate its ends, the strip or ribbon is bent to form a compound loop 40. The other or free end is formed with a flange portion 41 extending at right angles to the adjacent end and serving as a finger piece for manipulating the latching device.

In use, the frames 13 and 14 are spread apart and the slice of bread or the like to be toasted placed in the frame 13 within the confines of the flanges 16, 17, 18. The frame 14 is then swung inwardly into the frame 13, the dimensions of the frames being such as to permit this operation. The latching device 37 is then swung toward the upright portion 29 of the wire 28 of frame 14 whereby it will be snapped into locking position by means of the compound loop 40. The frames will thus be securely closed and the slice of bread locked in position between the frames. The frames are lowered into one of the slots 12 in the electric toaster 11 for cooking the bread. The latching device 37 can readily be unlatched by forcing the finger portion 41 thereof outwardly of the upright portion 29 of the wire 28 of frame 14. When the frames are closed, they are nested into compact construction as shown in Fig. 4.

While I have illustrated and described the preferred embodiment of my invention, it is to be understood that I do not limit myself to the precise constructions herein disclosed and that various changes and modifications may be made within the scope of the invention as defined in the appended claim.

Having thus described my invention, what I claim as new, and desire to secure by United States Letters Patent is:

A toast holder comprising a pair of frames having recesses opening toward each other, means connecting the edges of the frames for movement between an open position in which access to the recesses is permitted and a closed position in which the edges of the frames are nested and the recesses form a chamber for an article being toasted, an elongated wire connected to each frame and extending upwardly and laterally in a plane above the edges of the frames, opposite the connecting means, the free end of said wire being turned upon itself forming a loop, a cover over the looped portion of said wire constituting a handle, and a latching device on one of the elongated wires for releasably latching the frames in closed position, the first means comprising a hinge connection between the frames, said latching device including a metal strip having one end sleeved around said one elongated wire and a loop adjacent the other end of the strip detachably engageable with the other elongated wire for holding the frames in closed position, and a finger piece on the extreme end of said other end of the strip for manipulating said latching device.

References Cited in the file of this patent

UNITED STATES PATENTS

| | | |
|---|---|---|
| 353,571 | Meeker | Nov. 30, 1886 |
| 360,335 | Wood | Mar. 29, 1887 |
| 1,733,137 | Spang | Oct. 29, 1929 |
| 2,230,700 | Schwartz | Feb. 4, 1941 |